Nov. 10, 1964   T. D. WHITENACK, JR   3,156,408
ROTOR ELEMENT FOR LINE FLOW FAN
Filed June 18, 1963

INVENTOR.
TAYLOR D. WHITENACK, JR.
BY John K. Conant
ATTORNEY

United States Patent Office 3,156,408
Patented Nov. 10, 1964

3,156,408
ROTOR ELEMENT FOR LINE FLOW FAN
Taylor D. Whitenack, Jr., Fort Wayne, Ind., assignor to Engelhard Hanovia, Inc., Newark, N.J., a corporation of New Jersey
Filed June 18, 1963, Ser. No. 288,640
2 Claims. (Cl. 230—134)

The present invention relates to line flow fans for moving air or other fluids and more particularly it relates to a rotor element for such a fan.

A conventional line flow fan includes a cylindrical rotor made up of a plurality of long thin arcuate blades arranged parallel and tangential to the axis of rotation of the rotor and supported on disks mounted on an axle. The rotor is driven by an electric motor connected by belts or gears to the axle. The natural flow of air propelled by the blades is tangent to the periphery of the rotor around its entire circumference. The rotor is therefore mounted in a housing with openings in different sides to confine and direct the flow of air so that rotation of the rotor draws air through one side of the housing and forces it out the opening in another side of the housing.

The present invention is directed especially to the disks on which the fan blades are supported. The disks in accordance with the invention provide simple and effective means for supporting the blades and also are of an aerodynamic design which contributes to and improves the movement of air by the rotor.

In accordance with a preferred embodiment of the invention the disks of the rotor are made of a flexible material such as polyethylene. They are formed with a rim spaced from a hub and with generally flat, spoke-like vanes between the hub and the rim. The vanes are at an angle transverse the axis of rotation of the rotor so as to provide a propeller action as the disks rotate. This propeller action draws air in through ends of the rotor into the center and increases the flow of air through the rotor.

The blades are supported in radial slots in the rim. The outer end of the slots are at an angle to the length of the slots and provide stop portions which help hold the blades in the slots once inserted. The resiliency of the material of the disks enables the blades to be slipped easily into the slots and the blades are retained in the slots by a combination of spring pressure on the blades due to the arcuate shape of the blades and the resiliency of the disks and the locking effect of the angled ends of the slots.

Further objects and advantages of the rotor element of the present invention will be apparent from the following description and accompanying drawings in which.

Figure 1:
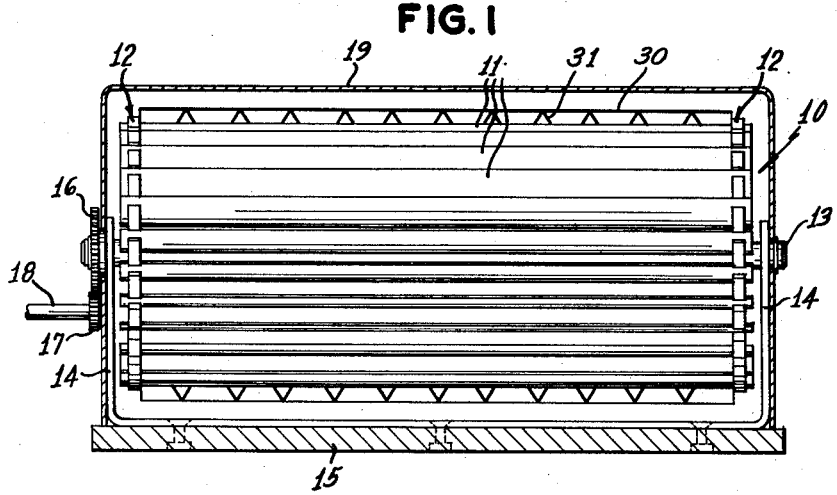
FIGURE 1 is a side view of a line flow fan rotor element of this invention.

Referring to FIGURE 1 of the drawings, a conventional line flow fan comprises a rotor made up of blades 11 supported on disks 12 which are fixed on an axle 13 journaled through supports 14 attached to a base 15. The rotor 10 may convenieently be driven by an electric motor, not shown, drivingly connected to the axle 13 engaging a gear 17 on a shaft 18 of the motor. The rotor 10 is completely enclosed in a housing indicated at 19. Openings 30 having grilles 31 are provided through opposite walls of the housing 19 and air or other fluid is drawn in through one opening and expelled through the other by rotation of the rotor 10, the housing serving to confine and direct the flow of air from one side of the rotor to another.

Figure 3:
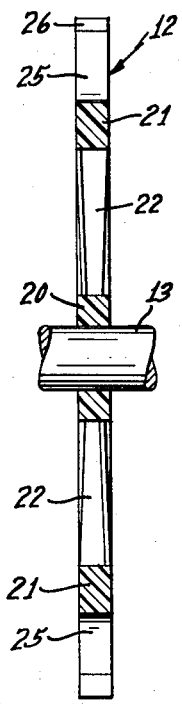
FIGURE 3 is a section along the lines 3—3 of FIGURE 2.
Figure 2:
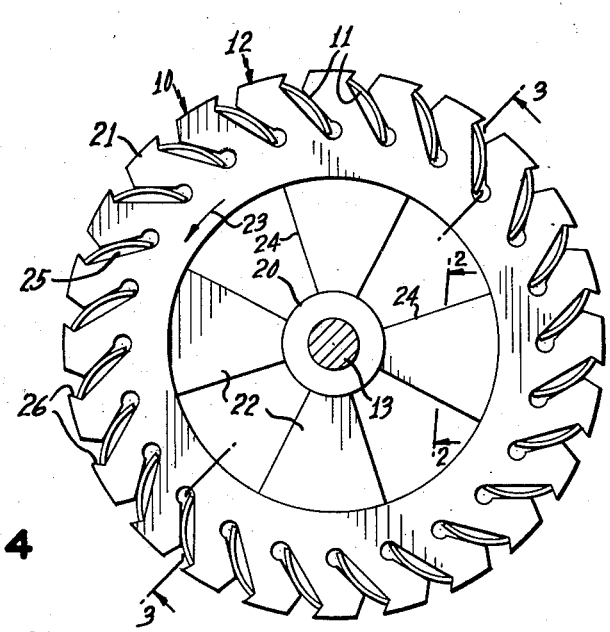
FIGURE 2 is an end view of the rotor of FIGURE 1.
Figure 4:
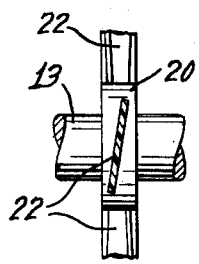
FIGURE 4 is a section along the lines 4—4 of FIGURE 3.

Looking now at FIGURES 2, 3, and 4, the disks 12 on which the blades 11 are supported each have a hub 20 and a rim 21 spaced from the hub with generally flat, spoke-like vanes 22 extending radially between the hub 20 and the rim 21 with open spaces between the vanes 22. As best seen in FIGURES 3 and 4 the vanes 22 are at an angle transverse the axis of rotation of the disks 12 and rotor 10 and are thus in the nature of propeller blades which force air to flow axially through the disks 11 as they rotate. In FIGURE 2 the direction of rotation of the disks 12 is indicated by the arrow 23 and the leading edges of the vanes relative to the direction of rotation are indicated at 24.

The leading edges 24 of the vanes 22 of the disks 12 at the respective ends of the rotor 10 are angled outwardly relative to the center of the rotor so that the vanes 22 draw air from both ends of the rotor into the center as the rotor 10 rotates. The vanes 22 thereby operate to increase the volume of air drawn into the rotor 10 and directed by the rotor in a stream through the outlet opening in the housing.

Looking at FIGURE 2 the blades 11 are arcuate in cross section and supported in slots 25 in the rim 21 of the disk 12. The slots 25 extend in a generally radial direction and open through the outer edge of the rim 21. As seen in the drawing the outer ends of the slots 25 are at an angle to the length of the slots and provide stop portions 26 at the outer ends.

The space between the walls of the slots is equal to or slightly less than, but in any case no greater than, the thickness of the blades as measured between the base and apex of the arcuate cross section of the blades. The length of the slots between their inner ends of the slots and the stop portions 26 is equal to or less than, but no greater than, the width of the blades 11. In addition, the disks 12, or at least their rims 21, are made of a resilient material such as polyethylene. The resiliency of the rims 21 and the dimensions of the slots 25 relative to the cross-sectional dimensions of the blades 11 are thereby adapted to secure the blades 11 in the slots 25. The respective edges of the blades 11 are against the stop portions 26 and the inner ends of the slots 25 and the apexes of the arcuate cross section of the blades bear against walls of the slots so as to hold the blades in place under slight spring pressure resulting from the arcuate cross section of the blades 11 and the resiliency of the material of the rim 21.

It will be appreciated that the above description is of a preferred embodiment of the fan rotor of the present invention and that certain modifications may be made in the structure and arrangement without departing from the spirit and scope of the invention defined in the following claims.

What is claimed is:

1. A rotor element for a line flow fan comprising a pair of disks spaced apart and mounted on an axle, a plurality of blades supported on said disks longitudinally parallel to said axle, said disks each having a rim portion of flexible and resilient material, slots in said rim portion, said blades being arcuate in cross section and supported in said slots in said rim portions, said slots extending generally radially of the disks and each having a closed end and an opposite end opening through an edge of said rim portion, and a stop portion at the open end of each slot extending into the slot as means to hold the blades in the slots, the length of each slot between its closed end and the stop portion therein being no greater than the width of one of said blades and the space between the walls of each slot being no greater than the thickness of one of said blades measured between the base and apex of the arcuate cross section of the blade.

2. A rotor element as set forth in claim 1 in which each disk includes a hub and in which said rim portion of each disk is spaced from the hub with generally flat spoke-like vanes extending radially between the hub and the rim portion, said vanes being at an angle other than a right angle transverse the axis of rotation of the rotor.

References Cited in the file of this patent

UNITED STATES PATENTS

| | | |
|---|---|---|
| 2,104,233 | Leinweber | Jan. 4, 1938 |
| 2,147,005 | Williams | Feb. 14, 1939 |
| 2,165,069 | Reynolds | July 4, 1939 |
| 3,021,049 | Settle | Feb. 13, 1962 |